(12) United States Patent
Menon et al.

(10) Patent No.: US 12,111,708 B2
(45) Date of Patent: Oct. 8, 2024

(54) UNINTERRUPTIBLE POWER SUPPLY WITH INTEGRATED DOCKING STATION

(71) Applicant: Vertiv Corporation, Columbus, OH (US)

(72) Inventors: Ramesh Menon, Cary, NC (US); Joseph Scarci, McMurray, PA (US); Brian Hockensmith, Columbus, OH (US); Jeremy Ruff, Columbus, OH (US); Jeanne Simeone, Narragansett, RI (US); Marek Stuczynski, Garrards Cross (GB); Jerry K. Green, Ostrander, OH (US)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 17/825,750

(22) Filed: May 26, 2022

(65) Prior Publication Data

US 2022/0382350 A1    Dec. 1, 2022

Related U.S. Application Data (60) Provisional application No. 63/194,388, filed on May 28, 2021.

(51) Int. Cl.
*G06F 1/26* (2006.01)
*G06F 1/18* (2006.01)
(Continued)

(52) U.S. Cl.
CPC .............. *G06F 1/266* (2013.01); *G06F 1/189* (2013.01); *G06F 1/263* (2013.01); *G06F 13/4004* (2013.01); *H02J 9/06* (2013.01)

(58) Field of Classification Search
CPC ........ G06F 1/1632; G06F 1/189; G06F 1/263; G06F 1/266; G06F 1/28; G06F 1/30;
(Continued)

(56) References Cited

U.S. PATENT DOCUMENTS 6,005,368 A    12/1999  Frame
6,070,247 A *  5/2000  Wallace ................... G06F 1/26
                                                        361/679.01

(Continued)

FOREIGN PATENT DOCUMENTS

CN    206946360    1/2018
CN    110096100    8/2019
(Continued)

OTHER PUBLICATIONS

International Search Report and Written Opinion for International Application No. PCT/US2022/031250 dated Aug. 30, 2022.

*Primary Examiner* — Thomas J. Cleary
(74) *Attorney, Agent, or Firm* — Suiter Swantz IP (57) ABSTRACT

The present invention is directed to a docking station system. The docking station system includes a housing that is constructed from outer walls. The housing defines a first compartment, a second compartment, and a third compartment. The docking station system further includes docking station circuitry disposed in the first compartment, one or more battery modules disposed in the second compartment, and uninterruptible power supply (UPS) circuitry disposed in the third compartment. The aforementioned UPS circuitry and docking station circuitry cooperate to enable certain functionalities. The certain functionalities can be one or more of smart shutdown, load shedding, or remote management functions.

20 Claims, 3 Drawing Sheets

(51) Int. Cl.
  *G06F 13/40* (2006.01)
  *H02J 9/06* (2006.01)
(58) Field of Classification Search
  CPC .... G06F 13/4004; G06F 13/4045; H02J 9/06; H02J 9/061; H02J 9/062
  See application file for complete search history.

(56) References Cited

U.S. PATENT DOCUMENTS

| | | | |
|---|---|---|---|
| 6,072,695 | A | 6/2000 | Steiger et al. |
| 6,184,654 | B1 | 2/2001 | Bachner et al. |
| 7,770,036 | B2 | 8/2010 | Dorogusker et al. |
| 7,849,250 | B2 | 12/2010 | Diener et al. |
| 8,990,469 | B2 * | 3/2015 | Benhard ............... G06F 1/1632 710/303 |
| 9,411,369 | B2 | 8/2016 | Schneider et al. |
| 2005/0168937 | A1 * | 8/2005 | Yin ....................... G06F 1/1632 361/679.41 |
| 2005/0213298 | A1 | 9/2005 | Doherty et al. |
| 2010/0128766 | A1 * | 5/2010 | Sugita ................... H04L 7/0008 375/220 |
| 2010/0213892 | A1 * | 8/2010 | DeSanctis ............. H02J 7/0013 320/107 |
| 2011/0266997 | A1 * | 11/2011 | Krancher ............... H02J 7/0044 361/679.01 |
| 2012/0287774 | A1 * | 11/2012 | Hinkle ................. H04L 12/5692 370/216 |
| 2013/0076132 | A1 | 3/2013 | Cohen |
| 2015/0130276 | A1 * | 5/2015 | McNeill-McCallum .................... H02J 9/06 307/23 |
| 2015/0216073 | A1 * | 7/2015 | Tyleshevski ........... H05K 7/202 361/692 |
| 2016/0197504 | A1 * | 7/2016 | Hsia ...................... H02J 7/0045 307/66 |
| 2017/0068272 | A1 * | 3/2017 | Loscalzo ............... G06F 1/1675 |
| 2017/0077702 | A1 * | 3/2017 | Hsieh ..................... G06F 1/189 |
| 2019/0064898 | A1 | 2/2019 | Nommensen et al. |
| 2019/0181494 | A1 * | 6/2019 | Maeda ............. H01M 10/0569 |
| 2019/0320555 | A1 * | 10/2019 | Flavin ................ H05K 7/20409 |
| 2020/0235607 | A1 * | 7/2020 | Kanarellis ........... G01R 19/2513 |
| 2020/0304328 | A1 * | 9/2020 | Boemi ................. H01R 13/6581 |

FOREIGN PATENT DOCUMENTS

| | | |
|---|---|---|
| JP | 2003257523 | 9/2003 |
| KR | 1020050049211 | 5/2005 |

* cited by examiner

UNINTERRUPTIBLE POWER SUPPLY WITH INTEGRATED DOCKING STATION

CROSS REFERENCE TO RELATED APPLICATION

The present application claims priority from U.S. provisional application Ser. No. 63/194,388, filed May 28, 2021, the disclosure of which is hereby incorporated by reference into the present disclosure.

FIELD OF THE INVENTION

The present invention relates to docking stations and uninterruptible power supplies (UPS) for mobile computing devices such as laptop or notebook computers.

BACKGROUND OF THE INVENTION

The statements in this section merely provide background information related to the present disclosure and may not constitute prior art.

A docking station provides a simplified method for connecting a mobile computing device to large number of peripherals with a diverse array of connection methods. An uninterruptible power supply (UPS) is a device separate from a docking station that provides emergency power to a mobile computing device and associated peripherals.

Current docking stations are plugged into a wall outlet in order to obtain AC power from the wall outlet. Mobile computing devices such as laptop computers and associated peripherals can be connected to the docking station. The docking station then converts the AC power to the required DC voltages in order to power the mobile computing device and associated peripherals. When an emergency causes the wall mains to cease providing power, the docking station likewise no longer provides power to the mobile computing device and associated peripherals. As separate devices, UPS systems provide battery backup for computers, monitors, routers, modems, gaming consoles and other electronics, allowing time for an orderly shutdown during a power outage or enough time to carry through brief outages. Examples of such UPS systems are VERTIV™ LIEBERT® PST5 UPS, models PST5-350MT120, PST5-500MT120, PST5-660MT120, and PST5-850MT120, which are manufactured by Applicant.

While UPS systems and docking stations can be utilized separately or on an improvised or ad-hoc basis, such as by plugging a docking station into a protected power port of a UPS system, such a solution is not only inelegant but necessarily "dumb" because UPS systems and docking stations are not integrated. For example, a UPS system powering a docking station would need to power not only the mobile device, but also all peripherals plugged into the docking station in every situation. In the case of an emergency power loss, this configuration is inefficient, increases wear and tear on the UPS system components, reduces the run time of the UPS system by requiring the provision a power to non-critical peripherals and the mobile computing device. Moreover, the software logic associated with the docking station and the mobile computing device would be unaware of any emergency situation until the UPS system can no longer provide emergency power.

Accordingly, there is a need for a solution to at least one of the aforementioned problems. For example, there is an established need for a docking station with an integrated UPS system. For another example, there is also an established need for a docking station that communicates with a UPS system. There is also an established need for additional functionality that becomes possible only when a docking station and UPS system are integrated in the same product.

SUMMARY OF THE INVENTION

This section provides a general summary of the disclosure and is not a comprehensive disclosure of its full scope or all of its features.

The present invention is directed to a docking station system. The docking station system includes a housing that is constructed from outer walls. The housing defines a first compartment, a second compartment, and a third compartment. The docking station system further includes docking station circuitry disposed in the first compartment, one or more battery modules disposed in the second compartment, and uninterruptible power supply (UPS) circuitry disposed in the third compartment. The aforementioned UPS circuitry and docking station circuitry cooperate to enable certain functionalities. The certain functionalities can be one or more of smart shutdown, load shedding, or remote management functions.

In some embodiments of the present invention, the outer walls include a front wall. The front wall includes a display screen for displaying a countdown timer indicating the current run time during which the UPS circuitry can support a load from the docking station circuitry, one or more indicator lights, and a power button. In some embodiments of the present invention, the outer walls of the docking station can further include a rear wall that itself includes power input ports, network interface ports, accessory ports, and display ports. The power input ports can include one or more of a USB-C port, a three prong port, and a Thunderbolt port. The network interface ports can include one or more of an RJ45 port and an indicator light. The accessory ports can include one or more three-prong power output ports. The display ports can include one or more three prong power output ports and a DisplayPort port. The power input ports, network interface ports, accessory ports, and display ports are electrically coupled to the UPS circuitry. In some embodiments of the present invention, the front wall and the rear wall further include one or more input ports associated with a USB hub and electrically coupled to the UPS circuitry. In some embodiments of the present invention, the one or more battery modules are lithium-ion battery modules. In some embodiments of the present invention, the UPS circuitry further includes a number of power rails, each rail being associated with the one or more power input ports, the network interface ports, and accessory ports, and the display ports. In some embodiments of the present invention, the UPS circuitry is configured to control the power state of the one or more of the power input ports, the network interface ports, the accessory ports, and the display ports through the plurality of power rails in response to one or more of the power state of a mobile computing device connected to the docking station, the power state of the one or more battery modules, and IT management software on the mobile computing device.

The present invention is also directed towards a docking station system. The docking station system includes a housing that itself includes outer walls and defines an interior having a first compartment, a second compartment, and a third compartment. Docking station circuitry is disposed in the first compartment. One or more battery modules are disposed in the second compartment. Uninterruptible power supply (UPS) circuitry that itself includes first, second, third, and fourth power rails is disposed in the third compartment. The outer walls further include a rear wall where the rear wall includes power input ports, network interface ports, accessory ports, and display ports. The power input ports can include one or more of a USB-C port, a three prong port, and a Thunderbolt port. The network interface ports can include one or more of an RJ45 port and an indicator light. The accessory ports can include one or more three-prong power output ports. The display ports can include one or more of three prong power output ports and a DisplayPort port. The power input ports, network interface ports, accessory ports, and display ports are electrically coupled to the UPS circuitry.

In some embodiments of the present invention, the UPS circuitry is configured to control the power state of the one or more of the power input ports, the network interface ports, the accessory ports, and the display ports though first, second, third and fourth power rails in response to one or more of the power state of a mobile computing device connected to the docking stations, the power state of the one or more battery modules, and IT management software. The UPS circuitry can be configured to prioritize the power rails in order from first, second, third, and fourth power rails.

The present invention is also directed towards a method of using a docking station system. The method includes, at step 164, a first step of providing a housing comprising outer walls, said housing defining a first compartment, a second compartment, and a third compartment. The method includes, at step 166, a second step of providing docking stations circuitry disposed in the first compartment. The method includes, at step 168, a third step of providing one or more lithium-ion battery modules disposed in the second compartment. The method includes, at step 170, a fourth step of providing uninterruptible power supply (UPS) circuitry including first and second power rails disposed in the third compartment. The method also includes, at step 172, a fifth step of connecting a mobile computing device to the docking station circuitry. The method also includes, at step 174, a sixth step of powering the mobile computing device with the first power rail. The method also includes, at step 176, a seventh step of connecting an accessory to the docking station circuitry. The method also includes, at step 178, an eighth step of powering the accessory rail with the second power rail.

In some embodiments, the method can further include the steps of receiving a shutdown command from the IT management software on the mobile computing device and prioritizing the first power rail over the second power rail when shutting down. The method can further include the steps of reading a state of charge of the one or more lithium-ion battery modules, shutting down the mobile computing device in response to a low state of charge, and prioritizing the first power rail over the second power rail when shutting down. The method can further include the steps of receiving a restart or update command from IT management software on the mobile computing device and maintaining power to the second rail while restarting the mobile computing device. The method can further include the steps of monitoring the presence of the accessory and sending a message from the IT management software on the mobile computing device in response to a user removing the accessory. The method can further include the steps of monitoring the presence of the accessory, receiving a restart or update command from IT management software on the mobile computing device, and maintaining power to the second rail while restarting the mobile computing device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed towards a docking station with an integrated uninterruptible power supply (UPS). Referring initially to FIGS. 1-4, one embodiment of a docking station system is depicted in accordance with an exemplary embodiment of the present invention.

Figure 1:
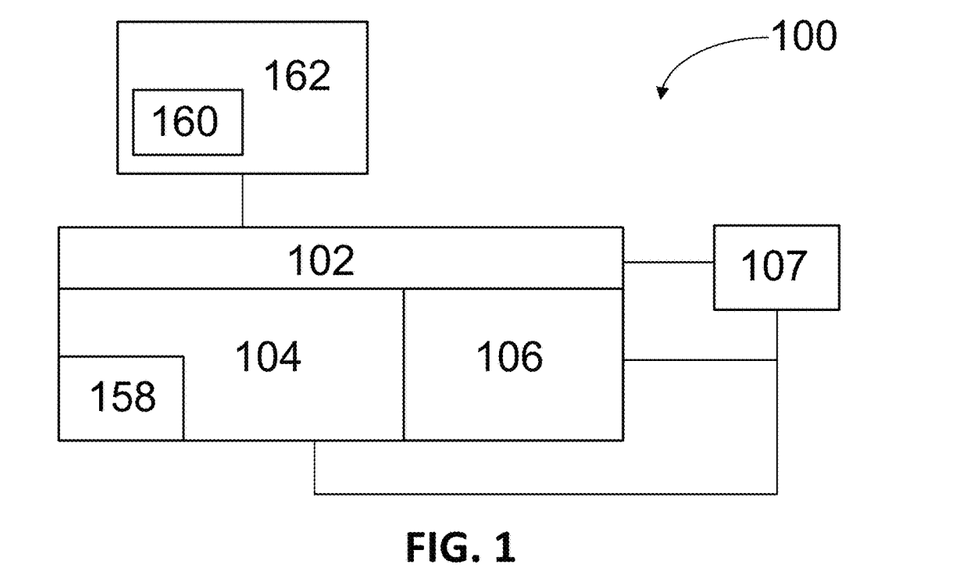
FIG. 1 is an internal schematic view of a docking station system in accordance with the present disclosure.

FIG. 1 schematically depicts a docking station system 100 and in particular the electrical components housed within the docking station system 100. The docking station system 100 includes docking station circuitry 102, uninterruptible power supply (UPS) circuitry 104, lithium-ion battery modules 106, and controller 107. As depicted, the docking station function is stacked on top of the UPS function. Such a configuration would be preferable in an implementation of the docking station system 100 (depicted in FIGS. 3-4) in order to provide mechanical balance, efficiently dissipate heat, and increase manufacturability.

The docking station circuitry 102 includes whatever components are required to power its internal components, accept power from UPS circuitry 104, and enable a docking station functionality. The docking station circuitry 102 can provide separate "rails" 158 or power circuits to a number of groups of peripherals and a mobile computing device 162. The docking station circuitry 102 can provide such rails 158 through an internal switching power supply or accept different voltages or phases of power from the UPS circuitry 104. The type of power accepted by the docking station circuitry and provided to each rail can be AC or DC. Each rail can correspond to groups of peripherals or even a single peripheral. As will be readily apparent to those of ordinary skill, an advantage of the docking station system 100 over previous docking stations is that each rail can be switched on and off in order to reduce load on the UPS circuitry 104 and maximize the run time from a given battery modules 106.

The UPS circuitry 104 includes whatever components are required to power its internal components, charge battery modules 106, provide power to the docking station circuitry 102, and provide a UPS function. The UPS circuity 104 is coupled to an AC power source (depicted in FIG. 2) in order to provide power to the docking station circuitry 102 and to charge lithium-ion battery modules 106. The lithium-ion battery modules 106 can either accept power from the UPS circuitry 104 in order to increase their state of charge, or provide power to the UPS circuitry 104 thereby discharging the battery modules 106. While the battery modules 106 are preferably batteries of a lithium-ion chemistry, it is contemplated that battery modules 106 can utilize any battery chemistry, such as lithium polymer, sealed lead acid, flooded acid, nickel metal hydride, any type of suitable battery chemistry, any suitable energy storage technology, flywheels, capacitors, or combination thereof. The UPS circuitry 104 can include a switch (not shown) and in particular a solid-state electrically controlled power switch such as an SCR that allows for fast and reliable switching between the battery modules 106 and AC power. The controller 107 includes whatever components are required to coordinate the function between the docking station circuitry 102 and the UPS circuitry 104.

Figure 2:
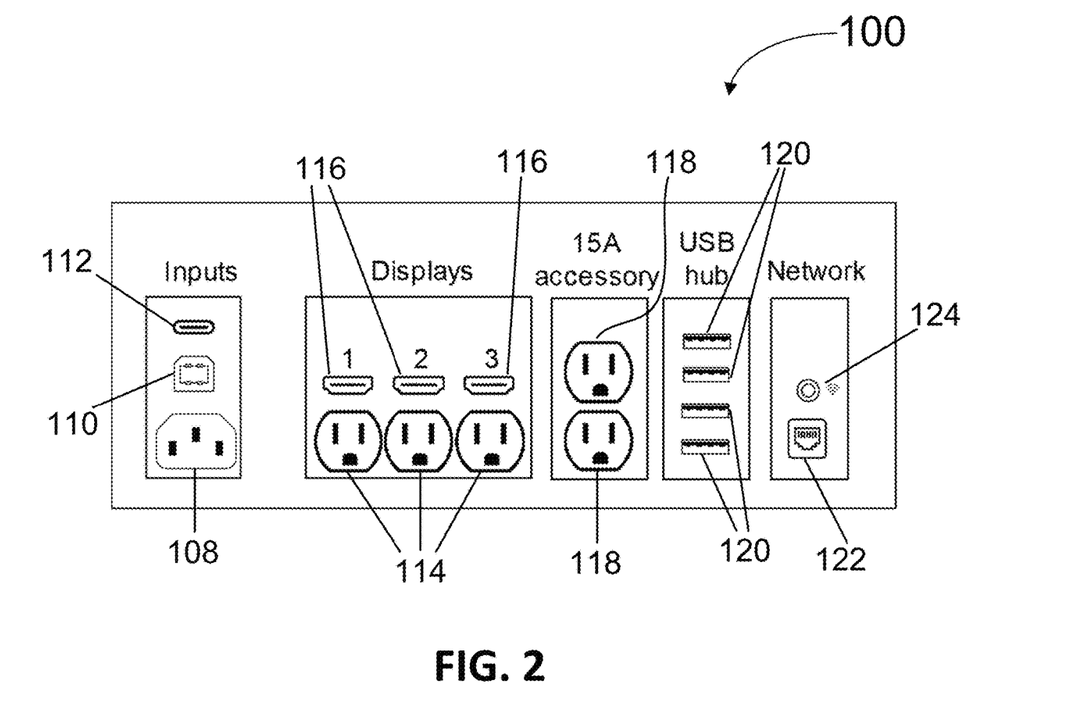
FIG. 2 is an external schematic view of the docking station system of FIG. 1.

FIG. 2 schematically depicts the docking station system 100 and in particular the external ports of the docking station system 100. The docking station system 100 includes input ports 108, 110, and 112. Input ports 108-112 can be seen to include a three-prong port 108, a Thunderbolt port 110 and a USB-C port 112. However, ports 108-112 can be substituted with any port that is capable of providing AC power to the docking station system 100 and connectivity to the mobile computing device 162. For example, ports 108-112 can be substituted, in whole or in part, with a USB-A port, a USB-B port, a USB-Micro port, a USB-Mini port, a DC plug barrel, or a two-prong power port. The docking station system 100 further includes display ports 114-116. Display ports 114-116 can be seen to include a number of three-prong ports 114 and an equal number of DisplayPort ("DP") ports 116. However, display ports 114-116 can be substituted with any port that is capable of providing power to a display peripheral and connecting the display peripheral to a mobile computing device 162. For example, three-prong ports 114 can be substituted, in whole or in part, with a DC plug barrel or a two-prong power port. DP ports 116 can also be substituted, in whole or in part, with a DVI port or a VGA port. The docking station system 100 further includes accessory ports 118. Accessory ports 118 can be seen to include a number of three-prong ports 118 and can further be seen to be current limited to 15 Amps. However, ports 118 can be substituted with any port that is capable of providing power to accessories. The docking station system 100 also includes USB hub ports 120. USB hub ports 120 can be seen to include a number of USB-A ports. However, ports 120 can be substituted with any port that is capable of providing USB connectivity. For example, ports 120 can be substituted, in whole or in part, with a USB-A port, a USB-B port, a USB-Micro port, or a USB-Mini port. The docking station system 100 correspondingly includes wired network interface ports 122 and 124. Wired network interface ports 122 and 124 can be seen to include an RJ45 port 122 and a wireless antenna port 124. However, ports 122 and 124 can be substituted with any port that is capable of providing network connectivity. For example, ports 122 and 124 can be substituted, in whole or in part, with a coaxial wired network port, an indicator light, or a permanently fixed wireless antenna.

In some embodiments, each group of ports (input ports 108-112, display ports 114-116, accessory ports 118, USB hub ports 120, and wired network interface ports 122-124) can be separately powered by different electrical "rails" or circuits. Some or all rails may be backed up by the UPS circuitry 104 (depicted in FIG. 1). Each rail may also be alternately connected or disconnected to backup power from the UPS circuitry 104 by a controller (not shown). As will be readily apparent, an advantage of the docking station system 100 over previous docking stations is that each rail can be switched on and off in order to reduce load on the UPS circuitry 104 and maximize the run time from the power provided by battery modules 106. In other embodiments, each individual port may be connected to an independent rail.

As should be further readily apparent, the integration of docking station circuitry 102 and UPS circuitry 104 in a single housing combined with separate rails for each of the ports 108-124 allows for functionality and coordination not previously achievable. For instance, UPS circuitry 104 can control the power state of peripherals attached to the ports 108-124 thereby allowing users to shut down monitors, cameras, mice, and other peripherals when the mobile computing device 162 is not in use. This first capability is known as "programmable power control." For another instance, UPS circuitry 104, now being directly connected to a mobile computing device 162 via the docking station circuitry 102, can automatically power down connected devices if the capabilities of battery modules 106 are threatened or if an emergency power condition occurs. In addition, the UPS circuitry 104 can power down one or more rails from the least important to the most important. This capability is known as "smart shutdown" and may be implemented in conjunction with IT management software 160 such as VERTIV™ Power Assist, created by Applicant. As another example, in order to maximize runtime during an emergency situation, the UPS circuitry 104 can prioritize the peripherals associated with each rail. The UPS circuitry 104 can even prioritize and shed the power load of the mobile computing device 162 by reading the state of charge of the mobile computing device 162, current load, and other factors. This capability is known as "load shedding" and may be implemented by the aforementioned software or via firmware. By way of a further example, an IT department can reliably remotely manage all devices connected to the docking station system 100. This remote management can include: resetting the mobile computing device 162 and connected peripherals that may require a clean power cycle; providing power consumption information, usage, and state of charge notifications and telemetry of the mobile computing device 162 and connected peripherals; and detecting the presence or absence of the mobile computing device 162 and connected peripherals in order to deter theft. The aforementioned capabilities can be implemented on controller 107 which coordinates docking station circuitry 102 and UPS circuitry 104.

Figure 3:
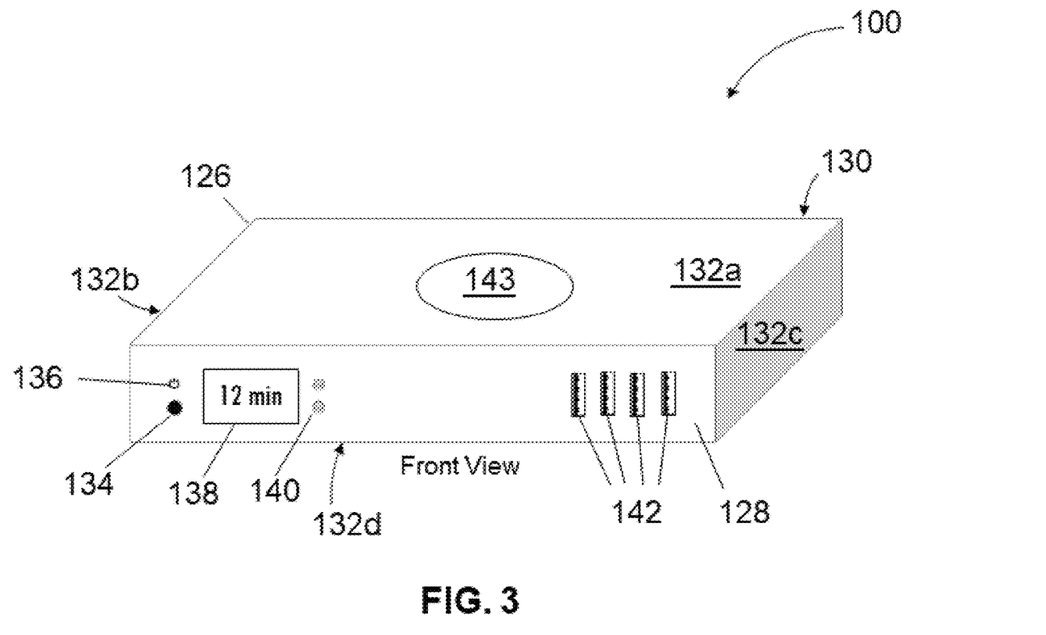
FIG. 3 is a front perspective view of the docking station system of FIG. 1.
Figure 4:
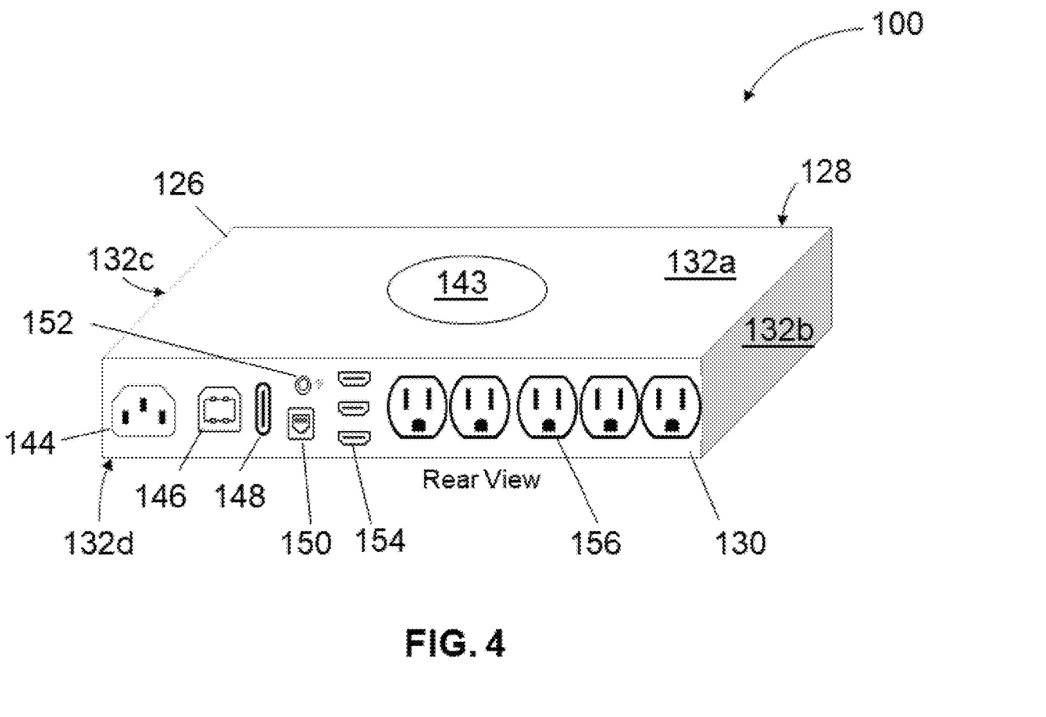
FIG. 4 is a rear perspective view of the docking station system of FIG. 1.

FIGS. 3-4 depict an implementation of docking station system 100. The docking station system 100 includes a housing 126 which is made from front panel 128, rear panel 130, and top, bottom and side panels 132A-D which cooperate to define an interior enclosure space. The housing 126 prevents users from accessing high voltage and sensitive internal equipment that are present in the docking station circuitry 102 and UPS circuitry 104. The housing 126 may allow access for a user to replace the lithium-ion battery modules 106.

With further reference to FIG. 3, the front panel 128 in this example can be seen to include a power button 134, a power indicator light 136, a display screen 138, controls 140, and USB ports 142. The display screen 138 can be seen to provide a countdown timer indicating the backup power remaining provided by UPS circuitry 104. With further reference to FIG. 4, the rear panel 130 in this example can be seen to include a three-prong power input port 144, a Thunderbolt port 146, a USB-C port 148, an RJ45 port 150, an indicator light 152, DisplayPort ports 154, and a number of three-prong power output ports 156. Any of the aforementioned ports 144-156 can be substituted with any port that is capable of providing equivalent functionality. In some embodiments, the docking station system 100 includes an integrated wireless charging pad 143 accessible on the top panel 132A. The wireless charging pad 143 can be compatible with wireless charging standards such as QI® or POWERMAT®. The docking station circuitry 102 can include the controller, power supply, and other support components to enable the use of the wireless charging pad 143. In other embodiments, the top panel 132A can additionally define a recess positioned to retain a peripheral capable of wireless charging, such as a mobile phone, on the integrated wireless charging pad 143. In alternate embodiments, the docking station system 100 can additionally include a magnet, retention clip, Velcro, or other mechanism located on the top panel 132A for retaining the wirelessly charging peripheral on the integrated wireless charging pad 143.

Figure 5:
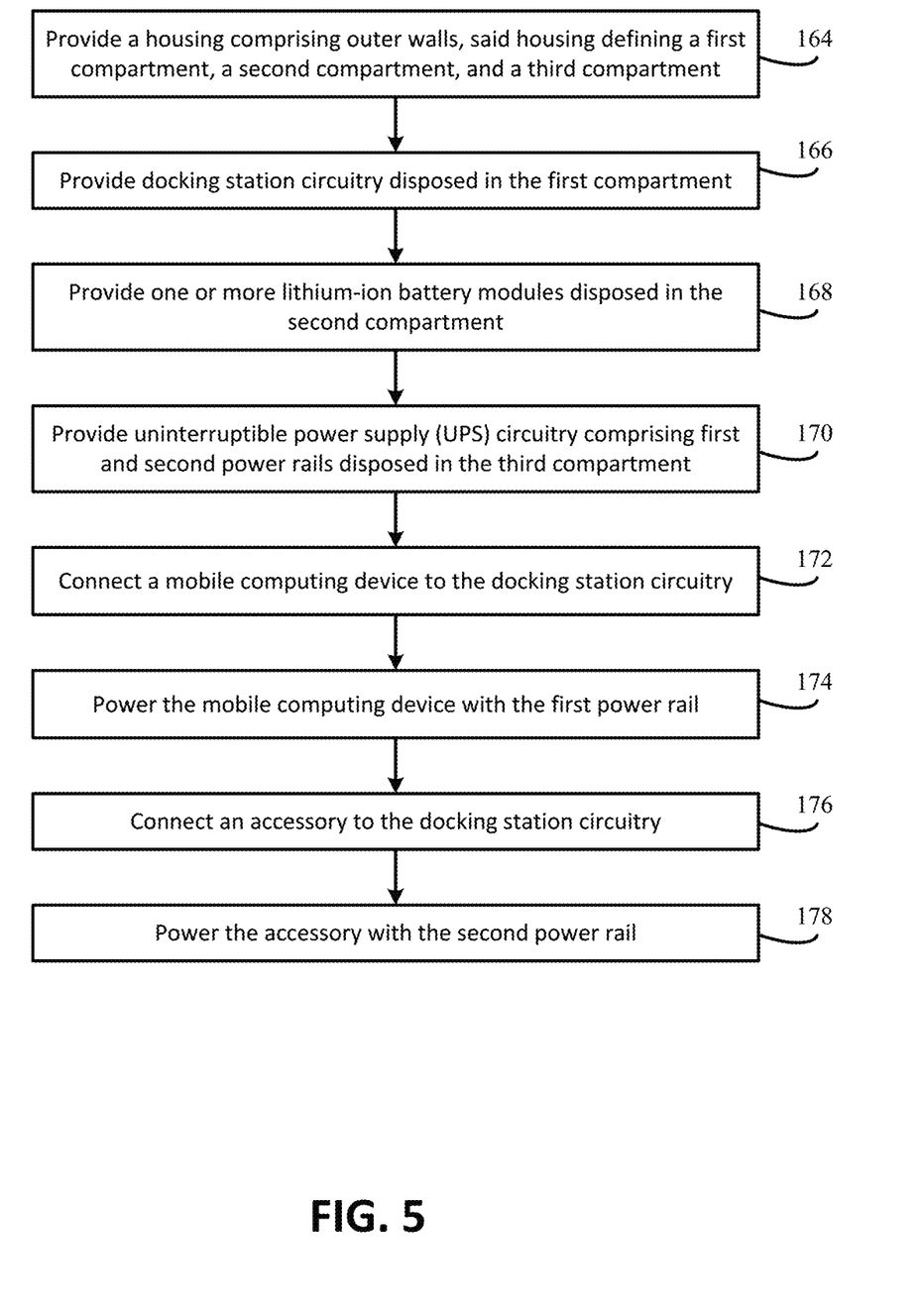
FIG. 5 shows a flow diagram of an exemplary method of using the docking station system of FIG. 1.

FIG. 5 shows a flow diagram of an exemplary method of using the docking station system of FIG. 1. The method includes, at step 164, a first step of providing a housing comprising outer walls, said housing defining a first compartment, a second compartment, and a third compartment. The method includes, at step 166, a second step of providing docking stations circuitry disposed in the first compartment. The method includes, at step 168, a third step of providing one or more lithium-ion battery modules disposed in the second compartment. The method includes, at step 170, a fourth step of providing uninterruptible power supply (UPS) circuitry including first and second power rails disposed in the third compartment. The method also includes, at step 172, a fifth step of connecting a mobile computing device to the docking station circuitry. The method also includes, at step 174, a sixth step of powering the mobile computing device with the first power rail. The method also includes, at step 176, a seventh step of connecting an accessory to the docking station circuitry. The method also includes, at step 178, an eighth step of powering the accessory rail with the second power rail.

Alternative embodiments are contemplated in which the docking station system is mounted in a standard rack and occupies 1U of space.

Alternate embodiments are contemplated in which the docking station system is integrated into a desk.

Alternate embodiments are contemplated in which the docking station system is integrated into a computer monitor.

Alternate embodiments are contemplated in which the docking station system is integrated into a wireless network router, repeater, or other node allowing for increased connectivity.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An integrated docking station and uninterruptible power supply (UPS) system, the system comprising:
    a housing comprising outer walls, said housing defining an interior having a first compartment, a second compartment, and a third compartment;
    docking station circuitry enclosed within the first compartment of the housing;
    one or more battery modules enclosed within the second compartment of the housing, wherein the one or more battery modules are configured to either accept supplied power from a UPS circuitry or supply power to the UPS circuitry;
    the UPS circuitry enclosed within the third compartment of the housing and comprising a plurality of power rails, the UPS circuitry configured to:
        supply power to the docking station circuitry;
        supply power to the one or more battery modules to increase a state of charge of the one or more battery modules;
        receive supplied power from the one or more battery modules;
        supply power to a plurality of ports disposed on at least one of the outer walls of the housing, wherein each power rail of the plurality of power rails is associated with one or more ports of the plurality of ports;
        separately control a power state of each port of the plurality of ports via a corresponding power rail of the plurality of power rails, wherein said UPS circuitry and said docking station circuitry cooperate to enable one or more of smart shutdown, load shedding, or remote management functions; and
        prioritize and shed power load of the mobile computing device by reading a state of charge of the mobile computing device; and
    a controller enclosed within the housing configured to:
        coordinate function between the docking station circuitry and the UPS circuitry, wherein the docking station circuitry and the UPS circuitry are enclosed in the same housing as the controller;
        reset to power cycle the mobile computing device and connected peripherals; and
        provide usage and notifications of the state of charge and telemetry of the mobile computing device and the connected peripherals.

2. The system of claim 1, wherein the outer walls comprise a first wall, the first wall comprising:
   a display screen for displaying a countdown timer indicating a current run time which the UPS circuitry can support a load from the docking station circuitry;
   one or more indicator lights; and
   a power button.

3. The system of claim 2, wherein the outer walls comprise a second wall, the second wall comprising:
   at least one power input port comprising at least one of a USB-C port, a three-prong port, or a Thunderbolt port;
   at least one network interface port comprising at least one of an RJ45 port, or an indicator light;
   at least one accessory port comprising a three-prong power output port; and
   at least one display port comprising at least one of three-prong power output port or DisplayPort (DP) port,
   wherein one or more of the at least one power input port, the at least one network interface port, the at least one accessory port, and the at least one display port are electrically coupled to the UPS circuitry.

4. The system of claim 3, wherein one or more of the first wall and the second wall further comprise one or more input or output ports associated with a USB hub and electrically coupled to the UPS circuitry.

5. The system of claim 4, wherein the one or more battery modules are lithium-ion battery modules.

6. The system of claim 5, wherein each power rail of the plurality of power rails is associated with a separate one or more of the at least one power input port, the at least one network interface port, the at least one accessory port, and the at least one display port, and wherein the UPS circuitry is configured to control the power state of the at least one power input port, the at least one network interface port, the at least one accessory port, and the at least one display port through the plurality of power rails in response to one or more of a power state of the mobile computing device connected to the docking station circuitry, a power state of the one or more battery modules, and IT management software on the mobile computing device.

7. The system of claim 1, further comprising the plurality of ports configured to detachably couple at least one or more of a peripheral or the mobile computing device, wherein the docking station circuitry comprises the controller configured to individually connect or disconnect supply of power to each power rail of the plurality of power rails.

8. An integrated docking station and uninterruptible power supply (UPS) system, comprising:
   a housing comprising outer walls, said housing defining an interior having a first compartment, a second compartment, and a third compartment;
   docking station circuitry enclosed within the first compartment of the housing;
   one or more battery modules enclosed within the second compartment of the housing, wherein the one or more battery modules are configured to either accept supplied power from a UPS circuitry or supply power to the UPS circuitry;
   the UPS circuitry comprising first, second, third, and fourth power rails of a plurality of power rails and enclosed within the third compartment of the housing, the UPS circuitry configured to:
      supply power to the docking station circuitry;
      supply power to the one or more battery modules to increase a state of charge of the one or more battery modules;
      receive supplied power from the one or more battery modules;
      supply power to a plurality of ports disposed on at least one of the outer walls of the housing, wherein each power rail of the plurality of power rails is associated with one or more ports of the plurality of ports; and
      separately control a power state of each port of the plurality of ports via a corresponding power rail of the plurality of power rails, wherein the outer walls further comprise a first wall, the first wall comprising:
         at least one power input port of the plurality of ports associated with the first power rail and comprising at least one of a USB-C port, a three-prong port, or a Thunderbolt port;
         at least one network interface port of the plurality of ports associated with the second power rail and comprising at least one of an RJ45 port or an indicator light;
         at least one accessory port of the plurality of ports associated with the third power rail and comprising at least one three-prong power output port;
         at least one display port of the plurality of ports associated with the fourth power rail and comprising at least one of three-prong power output port or DisplayPort (DP) port; and
      prioritize and shed power load of the mobile computing device by reading a state of charge of the mobile computing device; and
   a controller enclosed within the housing configured to:
      coordinate function between a docking station circuitry and a UPS circuitry, wherein the docking station circuitry and the UPS circuitry are enclosed in the same housing as the controller;
      reset to power cycle the mobile computing device and connected peripherals; and
      provide usage and notifications of the state of charge and telemetry of the mobile computing device and the connected peripherals.

9. The system of claim 8, wherein the UPS circuitry and the docking station circuitry cooperate to enable one or more of smart shutdown, load shedding, and remote management functions.

10. The system of claim 8, wherein the UPS circuitry is configured to control the power state of the at least one power input port, the at least one network interface port, the at least one accessory port, and the at least one display port through the first, second, third, and fourth power rails in response to one or more of a power state of the mobile computing device connected to the docking station circuitry, a power state of the one or more battery modules, and IT management software.

11. The system of claim 10, wherein the UPS circuitry is configured to prioritize the first, second, third, and fourth power rails in the following order: the first power rail, the second power rail, the third power rail, and the fourth power rail.

12. The system of claim 8, wherein the one or more battery modules are lithium ion battery modules.

13. The system of claim 8, wherein the outer walls comprise a second wall, the second wall comprising:
   a display screen for displaying a countdown timer indicating a current run time which the UPS circuitry can support a load from the docking station circuitry;
   one or more indicator lights; and
   a power button.

14. The system of claim 13, wherein one or more of the second wall and the first wall further comprise one or more input or output ports associated with a USB hub and electrically coupled to the UPS circuitry.

15. A method of using an integrated docking station and uninterruptible power supply (UPS) system, the method comprising:
providing a housing comprising outer walls, said housing defining a first compartment, a second compartment, and a third compartment;
providing docking station circuitry enclosed within the first compartment of the housing;
providing one or more lithium-ion battery modules enclosed within the second compartment of the housing, wherein the one or more lithium-ion battery modules are configured to either accept supplied power from a UPS circuitry or supply power to the UPS circuitry;
providing the UPS circuitry comprising first and second power rails of a plurality of power rails enclosed within the third compartment of the housing to:
supply power to the docking station circuitry;
supply power to the one or more lithium-ion battery modules to increase a state of charge of the one or more lithium-ion battery modules;
receive supplied power from the one or more lithium-ion battery modules;
supply power to a plurality of ports disposed on at least one of the outer walls of the housing, wherein each power rail of the plurality of power rails is associated with one or more ports of the plurality of ports;
separately control a power state of each port of the plurality of ports via a corresponding power rail of the plurality of power rails; and
prioritize and shed power load of the mobile computing device by reading a state of charge of the mobile computing device;
providing a controller enclosed within the housing to:
coordinate function between the docking station circuitry and the UPS circuitry, wherein the docking station circuitry and the UPS circuitry are enclosed in the same housing as the controller;
reset to power cycle the mobile computing device and connected peripherals; and
provide usage and notifications of the state of charge and telemetry of the mobile computing device and the connected peripherals;
connecting the mobile computing device to the docking station circuitry;
powering the mobile computing device with the first power rail;
connecting an accessory to the docking station circuitry; and
powering the accessory with the second power rail.

16. The method of claim 15 further comprising:
receiving a shutdown command from an IT management software on the mobile computing device; and
prioritizing the first power rail over the second power rail when shutting down.

17. The method of claim 15 further comprising:
reading the state of charge of the one or more lithium-ion battery modules;
shutting down the mobile computing device in response to a particular reading of the state of charge; and
prioritizing the first power rail over the second power rail when shutting down.

18. The method of claim 15 further comprising:
receiving a restart or update command from IT management software on the mobile computing device; and
maintaining power to the second power rail while restarting the mobile computing device.

19. The method of claim 15 further comprising:
monitoring a presence of the accessory; and
in response to a user removing the accessory, sending a message from IT management software on the mobile computing device.

20. The method of claim 15 further comprising:
monitoring a presence of the accessory; and
receiving a restart or update command from IT management software on the mobile computing device; and
maintaining power to the second power rail while restarting the mobile computing device.

* * * * *